(12) United States Patent
Yamashita

(10) Patent No.: US 10,235,116 B2
(45) Date of Patent: Mar. 19, 2019

(54) INFORMATION PROCESSING APPARATUS, PROGRAM, PRINTING APPARATUS, AND PRINTING SYSTEM FOR PRINTING RELATED INFORMATION ASSOCIATED WITH CODE INFORMATION

(71) Applicant: SEIKO EPSON CORPORATION, Tokyo (JP)

(72) Inventor: Mitsuhiro Yamashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/842,086

(22) Filed: Dec. 14, 2017

(65) Prior Publication Data

US 2018/0173481 A1 Jun. 21, 2018

(30) Foreign Application Priority Data

Dec. 15, 2016 (JP) ................................. 2016-243400

(51) Int. Cl.
 *G06F 3/12* (2006.01)
 *G06K 17/00* (2006.01)
 *G06K 15/02* (2006.01)
 *G06F 17/30* (2006.01)

(52) U.S. Cl.
 CPC ............ *G06F 3/1297* (2013.01); *G06F 3/129* (2013.01); *G06F 3/1296* (2013.01); *G06K 15/1856* (2013.01); *G06K 17/0016* (2013.01); *G06K 17/0022* (2013.01); *G06F 17/30* (2013.01)

(58) Field of Classification Search
 None
 See application file for complete search history.

(56) References Cited

U.S. PATENT DOCUMENTS

| 5,227,617 | A | | 7/1993 | Christopher et al. |
| 5,448,046 | A | | 9/1995 | Swartz |
| 5,602,377 | A | * | 2/1997 | Beller ..................... G06K 1/121 235/385 |
| 2011/0286012 | A1 | * | 11/2011 | De Munck ............. B41J 3/4075 358/1.6 |
| 2012/0095823 | A1 | * | 4/2012 | Tak ....................... G06Q 10/087 705/14.38 |
| 2013/0270341 | A1 | * | 10/2013 | Janneh ................... G06F 17/30 235/383 |
| 2015/0371128 | A1 | * | 12/2015 | Osborne ........... G06K 19/06112 235/462.01 |

FOREIGN PATENT DOCUMENTS

| JP | 05-333778 A | 12/1993 |
| JP | 2010-194741 A | 9/2010 |
| JP | 2010-221428 A | 10/2010 |
| JP | 2011-016300 A | 1/2011 |
| WO | WO-96/27852 A2 | 9/1996 |

OTHER PUBLICATIONS

Extended European Search Report dated May 14, 2018 in related European Appl. No. 17207450.2 (8 pgs.).

* cited by examiner

*Primary Examiner* — Dung D Tran

(74) *Attorney, Agent, or Firm* — Foley & Lardner LLP

(57) ABSTRACT

An information processing apparatus includes a code information acquisition unit that acquires code information indicated by a code image, and a print data generation unit that generates print data based on related information extracted based on the code information acquired by the code information acquisition unit from a database in which the code information and the related information are stored in association with each other.

18 Claims, 18 Drawing Sheets

FIG. 2

| TYPE OF CODE IMAGE | SAMPLE | |
|---|---|---|
| JAN (CODE FOR GENERAL DISTRIBUTION) | 4 901234 567894 | G1 |
| JAN (IN-STORE CODE) | 2 012345 678903 | G1 |
| JAN (ISBN) | 9 784123 456005 | G1 |
| NW-7 | A123456789012A | G1 |

| CODE INFORMATION | RELATED INFORMATION | | |
|---|---|---|---|
| | MANUFACTURE NAME INFORMATION | PRODUCT NAME INFORMATION | PHOTOGRAPH IMAGE DATA |
| 2012345678903 | A COMPANY | AB-123 | ◇ |
| 2009876543213 | B COMPANY | XYZ-999 | ◯ |
| · · · · · · | · · · · · · | · · · · · · | · · · · · · |

301

| CODE INFORMATION | RELATED INFORMATION | | |
|---|---|---|---|
| | DISTRIBUTION STATION | RECEIVED DATE | RECEIVED TIME |
| A12345B | A | 2016/10/1 | 13:30 |
| | B | 2016/10/1 | 18:15 |
| | C | 2016/10/2 | 8:53 |
| ・・・・・・ | ・・・・・ | ・・・・・ | ・・・・・ |
| | ・・・・・ | ・・・・・ | ・・・・・ |

INFORMATION PROCESSING APPARATUS, PROGRAM, PRINTING APPARATUS, AND PRINTING SYSTEM FOR PRINTING RELATED INFORMATION ASSOCIATED WITH CODE INFORMATION

BACKGROUND

1. Technical Field

The present invention relates to an information processing apparatus which generates print data, a program, a printing apparatus, and a printing system.

2. Related Art

A barcode label in which an identification mark related to a barcode symbol is printed together with the barcode symbol which is a code image has been proposed (see JP-A-5-333778).

Generally, an operator often cannot recognize an object specified by code information indicated by a code image, such as a barcode symbol, by simply seeing the code image. Thus, even if an operator who will print a related image related to the code image sees the related image, it is difficult to determine whether the related image actually relates to the code image. Therefore, there is a possibility that the operator incorrectly selects a related image that is not related to the code image (for example, the operator selects a product name image of a product B for the code image of a product A), and as a result, a related image that is not related to the code image may be printed.

SUMMARY

An advantage of some aspects of the invention is to provide an information processing apparatus, a program, a printing apparatus, and a printing system capable of preventing printing of a related image which is not related to a code image.

An information processing apparatus according to a first aspect of the invention includes a code information acquisition unit that acquires code information indicated by a code image, and a print data generation unit that generates print data based on related information extracted based on the code information acquired by the code information acquisition unit from a database in which the code information and the related information are stored in association with each other.

According to this configuration, when the code information is acquired, print data will be generated based on the related information associated with the acquired code information. Therefore, a related image corresponding to the related information will be included in an image printed based on the generated print data. The related image will be related to the code image which indicates the acquired code information. Therefore, printing of the related image which is not related to the code image can be avoided.

In this case, the information processing apparatus desirably further includes a local database that functions as the database, and a local extraction unit that refers to the local database and extracts the related information associated with the code information acquired by the code information acquisition unit.

According to this configuration, when the code information is acquired, the local database is referred to, and the related information associated with the acquired code information is extracted. Then, the print data is generated based on the extracted related information.

In this case, the information processing apparatus desirably further includes a code information transmission unit that transmits the code information acquired by the code information acquisition unit to a server which is connected to the information processing apparatus via a network and in which a server database functioning as the database is provided, and a related information receiving unit that receives the related information extracted from the server database and then transmitted based on the code information received by the server.

According to this configuration, when the code information is acquired, the acquired code information will be transmitted to the server. When the code information is received by the server, related information will be extracted from the server database based on the received code information, and the extracted related information will be transmitted to the information processing apparatus. When the related information is received in the information processing apparatus, print data will be generated based on the received related information.

In this case, it is desirable that the information processing apparatus desirably further includes a local database that functions as the database, a local extraction unit that refers to the local database and extracts the related information associated with the code information acquired by the code information acquisition unit, a code information transmission unit that transmits the code information acquired by the code information acquisition unit to a server which is connected to the information processing apparatus via a network and in which a server database functioning as the database is provided, and a related information receiving unit that receives the related information extracted from the server database and then transmitted based on the code information received by the server, wherein after the code information acquisition unit acquires the code information, the local extraction unit refers to the local database, if the related information is not extracted from the local database by the local extraction unit, the code information transmission unit transmits the code information to the server.

According to this configuration, the local database is preferentially referred to between the local database and the server database. Therefore, related information can be efficiently extracted.

In this case, the information processing apparatus desirably further includes a local database that functions as the database, a local extraction unit that refers to the local database and extracts the related information associated with the code information acquired by the code information acquisition unit, a code information transmission unit that transmits the code information acquired by the code information acquisition unit to a server which is connected to the information processing apparatus via a network and in which a server database functioning as the database is provided, a related information receiving unit that receives the related information extracted from the server database and then transmitted based on the code information received by the server, a type determining unit that determines a type of the code image based on the code information acquired by the code information acquisition unit, wherein in accordance with the type of the code image determined by the type determining unit, whether the local extraction unit refers to the local database or the code information transmission unit transmits the code information to the server is switched.

According to this configuration, the database in accordance with the type of the code image is referred to between the local database and the server database, and the related information is extracted from that database. Therefore, related information can be efficiently extracted.

In this case, the information processing apparatus desirably further includes a code information transmission unit that transmits the code information to a plurality of servers which is connected with the information processing apparatus via a network and in which a plurality of server databases functioning as the databases and corresponding to each of different countries is provided, a related information receiving unit that receives the related information extracted from the server database and then transmitted based on the code information received by the server, and a country determining unit that determines a target country of the code image based on the code information acquired by the code information acquisition unit, wherein the code information transmission unit transmits the code information to the server in which the server database corresponding to the target country determined by the country determining unit is provided among the plurality of servers.

According to this configuration, a server database corresponding to the target country of the code image determined by the country determining unit among a plurality of server databases is referred to, and related information is extracted from that server database. Therefore, related information can be efficiently extracted.

In this case, the code information acquisition unit desirably acquires information indicated by a barcode symbol which is the code image as the code information.

In this case, the information processing apparatus desirably further includes a type determining unit that determines a type of the code image based on the code information acquired by the code information acquisition unit, and a report unit that reports the type of the code image determined by the type determining unit.

According to this configuration, the operator can check the type of the code image corresponding to the acquired code information.

In this case, the information processing apparatus desirably further includes a print transmission unit that transmits the print data generated by the print data generation unit and a print instruction to the printing apparatus.

According to this configuration, the generated print data and the print instruction are transmitted from the information processing apparatus and, thereby, acquired by the printing apparatus. Therefore, the printing apparatus can be made to start printing easily.

In this case, the information processing apparatus desirably further includes a detection unit that detects a print instruction operation, wherein the print transmission unit transmits the print data and the print instruction to the printing apparatus if the detection unit detects the print instruction operation.

According to this configuration, when the operator performs a print instruction operation, that print instruction operation will be detected and the print data and the print instruction will be transmitted to the printing apparatus. Therefore, the printing apparatus can be made to execute printing at desirable timing for the operator.

In this case, the code information acquisition unit desirably acquires the code information by reading the code information in the code image.

According to this configuration, erroneous input can be avoided as compared with a case in which the code information is acquired by making an operator input the code information, and time and effort for inputting the code information can be saved.

In this case, the print data generation unit generates print data based on the related information and the code information acquired by the code information acquisition unit.

According to this configuration, in addition to the related image, the code image related to the related image is included in the image printed based on the generated print data. Therefore, the printing apparatus can be made to print a printed matter in which the code image and the related image are integrated.

In this case, the information processing apparatus desirably further includes a detection unit that detects a selection operation to select one layout from among a plurality of layouts which defines arrangement of a related image corresponding to the related information and the code image corresponding to the code information, wherein the print data generation unit generates the print data in the selected layout based on the detection result of the selection operation by the detection unit.

According to this configuration, the operator can be made to select a layout in which the arrangement of the related image and the code image is defined.

A program according to a second aspect of the invention is for causing a computer to function as the information processing apparatus described above.

According to this configuration, a computer can be made to function as the information processing apparatus in which printing of the related image which is not related to the code image can be avoided.

A printing apparatus according to a third aspect of the invention includes a code information acquisition unit that acquires code information indicated by a code image, a print data generation unit that generates print data based on related information extracted based on the code information acquired by the code information acquisition unit from a database in which the code information and the related information are stored in association with each other, and a printing unit that executes printing based on the print data generated by the print data generation unit.

According to this configuration, when the code information is acquired, print data will be generated based on the related information associated with the acquired code information. Therefore, a related image corresponding to the related information will be included in an image printed based on the generated print data. The related image will be related to the code image which indicates the acquired code information. Therefore, printing of the related image which is not related to the code image can be avoided.

A printing system according to a fourth aspect of the invention includes an information processing apparatus and a printing apparatus, wherein the information processing apparatus includes a code information acquisition unit that acquires code information indicated by a code image, a print data generation unit that generates print data based on related information extracted based on the code information acquired by the code information acquisition unit from a database in which the code information and the related information are stored in association with each other, and a print transmission unit that transmits the print data generated by the print data generation unit and a print instruction to the printing apparatus, and wherein the printing apparatus executes printing in accordance with the print data and the print instruction transmitted by the information processing apparatus.

According to this configuration, when the code information is acquired, print data will be generated based on the related information associated with the acquired code information. Therefore, a related image corresponding to the related information will be included in an image printed based on the generated print data. The related image will be related to the code image which indicates the acquired code information. Therefore, printing of the related image which is not related to the code image can be avoided.

In this case, the printing apparatus desirably further includes a server which is connected to the information processing apparatus via a network, and in which a server database which functions as the database is provided, wherein the information processing apparatus further includes a code information transmission unit that transmits the code information acquired by the code information acquisition unit to the server and a related information receiving unit that receives the related information extracted from the server database and then transmitted based on the code information received by the server, wherein the server includes a code information receiving unit that receives the code information transmitted from the code information transmission unit, a server extraction unit that extracts the related information associated with the code information received by the code information receiving unit from the server database, and a related information transmission unit that transmits the related information extracted by the server extraction unit to the information processing apparatus.

According to this configuration, when the code information is acquired in the information processing apparatus, the acquired code information will be transmitted to the server. When the code information is received by the server, related information will be extracted from the server database based on the received code information, and the extracted related information will be transmitted to the information processing apparatus. When the related information is received in the information processing apparatus, print data will be generated based on the received related information.

BRIEF DESCRIPTION OF THE DRAWINGS

The invention will be described with reference to the accompanying drawings, wherein like numbers reference like elements.

FIG. 2 illustrates types of code images.

FIG. 5 illustrates a local database and a server database.

DESCRIPTION OF EXEMPLARY EMBODIMENTS

Hereinafter, embodiments of an information processing apparatus, a program, a printing apparatus, and a printing system of the invention will be described with reference to the appended drawings.

Figure 1:
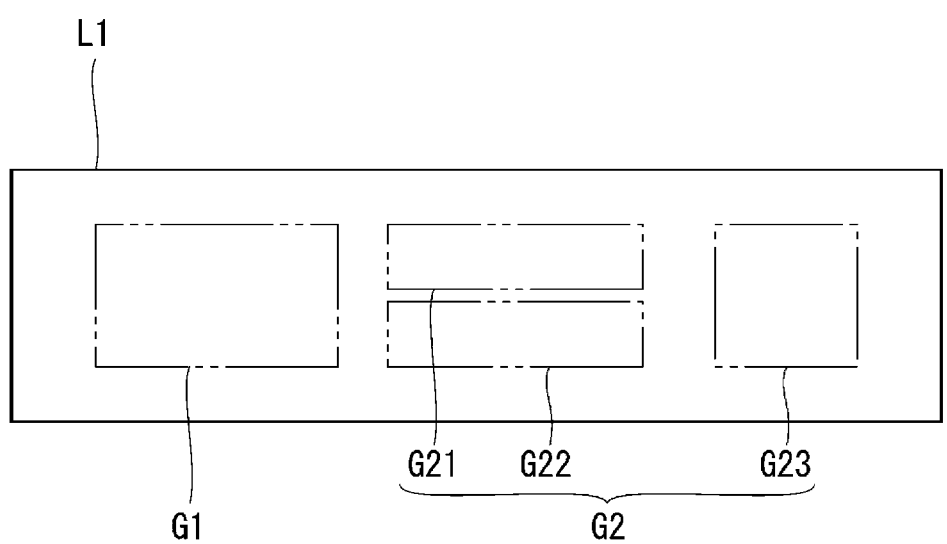
FIG. 1 illustrates a code related label to be printed by a printing system according to an embodiment of the invention.

With reference to FIG. 1, a code related label L1 which is printed by printing systems Sy1 to Sy5 according to each of later-described embodiments will be described. Code image G1 and related images G2 are printed on the code related label L1.

The code image G1 indicates, as information which specifies a certain product, code information in which, for example, a country name, a manufacturer name, and a product name are coded (for example, a plurality of digits of numbers, English letters, and signs).

Each of the related images G2 is an image related to the code image G1. In the example illustrated in FIG. 1, a manufacturer name image G21, a product name image G22, and a photographic image G23 are printed as the related images G2. The manufacturer name image G21, the product name image G22, and the photographic image G23 indicate a manufacturer name, a product name, and an exterior of the product specified by the code information indicated by the code image G1, respectively.

With reference to FIG. 2, types of the code image G1 will be described. As a type of the code image G1, for example, JAN or NW-7 (CODABAR) illustrated in FIG. 2 may be used. The type of the code image G1 is not limited to those illustrated in FIG. 2, and for example EAN, UPC, or ITF may also be used. JAN is classified into, for example, a code for general distribution, an in-store code, an ISBN depending on the purpose thereof. Different country codes (GS1 prefixes) are assigned to the code for general distribution, the in-store code, and the ISBN. The code for general distribution is printed (source marked) on a packaging material of a product, for example, in the stage of producing and packing of the product by a manufacturer, for example. The in-store code is printed (in-store marked) for the management in the own store by a retailer. The ISBN is used for books. All of the code images G1 illustrated in FIG. 2 are barcode symbols, however, the code images G1 are not limited to the same, and may be two-dimensional code symbols, for example.

Figure 3:
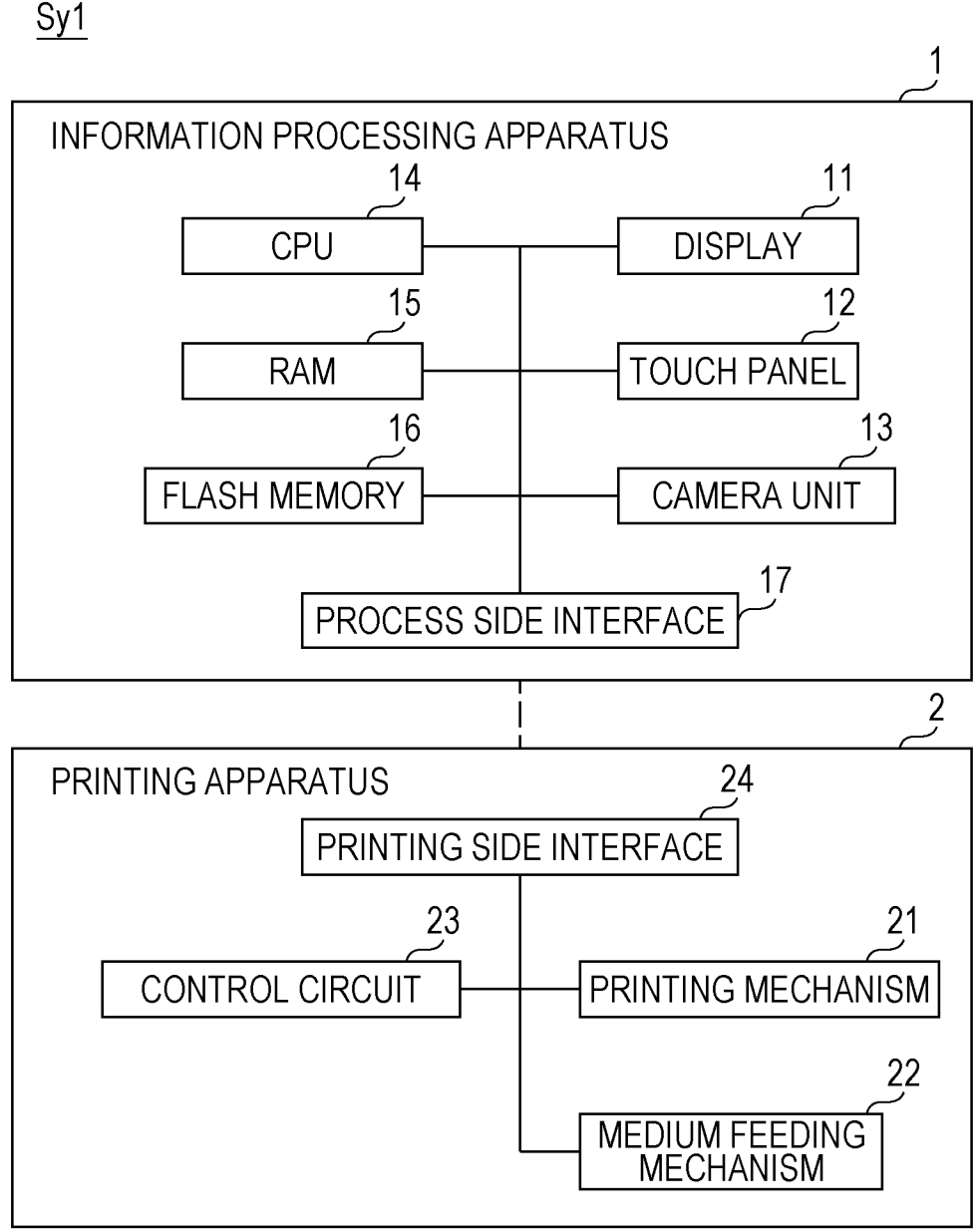
FIG. 3 is a block diagram illustrating a hardware configuration of a printing system according to a first embodiment.

With reference to FIG. 3, a hardware configuration of the printing system Sy1 of the first embodiment will be described. The printing system Sy1 includes an information processing apparatus 1 and a printing apparatus 2. The information processing apparatus 1 generates print data based on related information extracted from a local database 104 (see FIG. 4) provided in the information processing apparatus 1, and transmits the generated print data to the printing apparatus 2. The printing apparatus 2 is an apparatus which prints the code related label L1. Specifically, for example, the printing apparatus 2 is a tape printer which executes printing on a wound tape member as a printing medium and cuts the wound tape member into pieces of tape. The printing apparatus 2 receives print data transmitted from the information processing apparatus 1, and executes printing on a printing medium based on the received print data.

The information processing apparatus 1 is a smart phone as a computer in which an application program supported by the printing apparatus 2 (hereinafter "supported application") is installed. The computer is not limited to a smart phone, and may be any apparatus that can implement each of later-described functions of the information processing apparatus 1 by the supported application. Computers may be a tablet terminal and a personal computer, for example, in addition to a smart phone.

The information processing apparatus 1 includes a display 11, a touch panel 12, a camera unit 13, a central processing unit (CPU) 14, random access memory (RAM) 15, flash memory 16, and a process side interface 17. The display 11 performs various types of displaying. The touch panel 12 is provided to be superimposed on the display 11, and detects a position in which a surface of the touch panel 12 is pressed by an operation of an operator. The camera unit 13 includes an image sensor, and captures a still image and a video image. The CPU 14 executes various processes by executing various programs (including the supported application) stored in the flash memory 16 using the RAM 15. The process side interface 17 transmits and receives various commands and various types of data to and from an external device, such as the printing apparatus 2.

The printing apparatus 2 includes a printing mechanism 21, a medium feeding mechanism 22, a control circuit 23, and a print side interface 24. The printing mechanism 21 executes printing on a printing medium. A printing method of the printing mechanism 21 is not particularly limited, and a thermal system, an electrophotographic system, or an ink jet system may be used, for example. The printing medium is not particularly limited, and rolled paper or sheet paper may be used, for example, in addition to the tape member described above. The medium feeding mechanism 22 feeds the printing medium. The control circuit 23 includes an unillustrated CPU and various types of memory, and controls the printing mechanism 21 and the medium feeding mechanism 22 in accordance with a control program. The print side interface 24 transmits and receives various commands and various types of data to and from the information processing apparatus 1.

Figure 4:
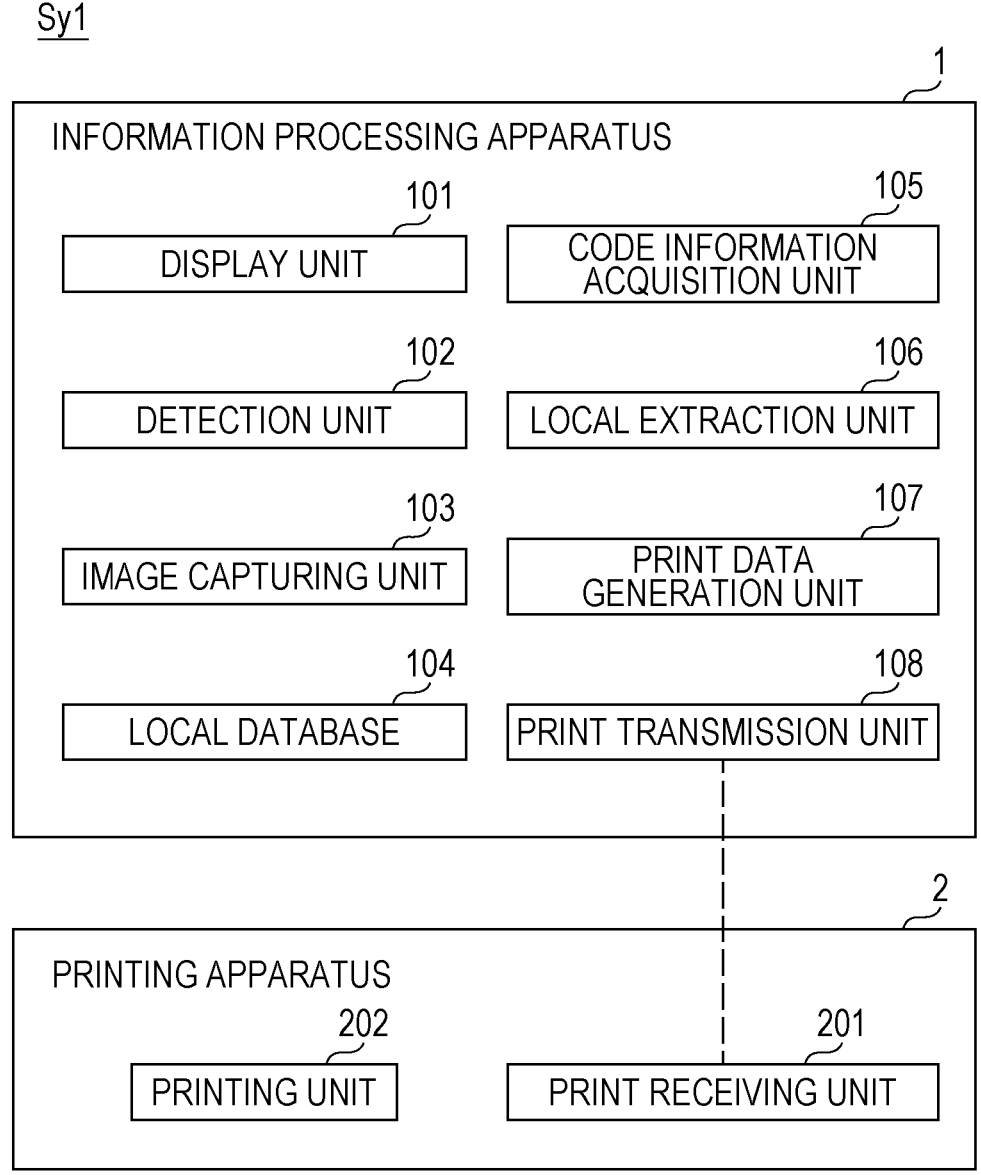
FIG. 4 is a block diagram illustrating a functional configuration of the printing system according to the first embodiment.

With reference to FIG. 4, a functional configuration of the printing system Sy1 will be described. The information processing apparatus 1 includes a display unit 101, a detection unit 102, an image capturing unit 103, the local database 104, a code information acquisition unit 105, a local extraction unit 106, a print data generation unit 107, and a print transmission unit 108. The display unit 101 is implemented by the display 11. The detection unit 102 is implemented by the touch panel 12. The image capturing unit 103 is implemented by the camera unit 13. The local database 104 is provided in the flash memory 16. The code information acquisition unit 105, the local extraction unit 106, and the print data generation unit 107 are implemented when the CPU 14 executes the supported application, however, a part or all of these units may be implemented only by a hardware resource. The print transmission unit 108 is implemented by the process side interface 17.

The printing apparatus 2 includes a print receiving unit 201 and a printing unit 202. The print receiving unit 201 is implemented by the print side interface 24. The printing unit 202 is implemented by the printing mechanism 21, the medium feeding mechanism 22, and the control circuit 23.

With reference to FIG. 5, the local database 104 will be described. Code information and related information are stored in association with each other in the local database 104. In the example illustrated in FIG. 5, manufacturer name information, product name information, and photograph image data are stored as related information. The manufacturer name information, the product name information, and the photograph image data correspond to a manufacturer name, a product name, and an exterior of a product specified by the code information, respectively.

Figure 6:
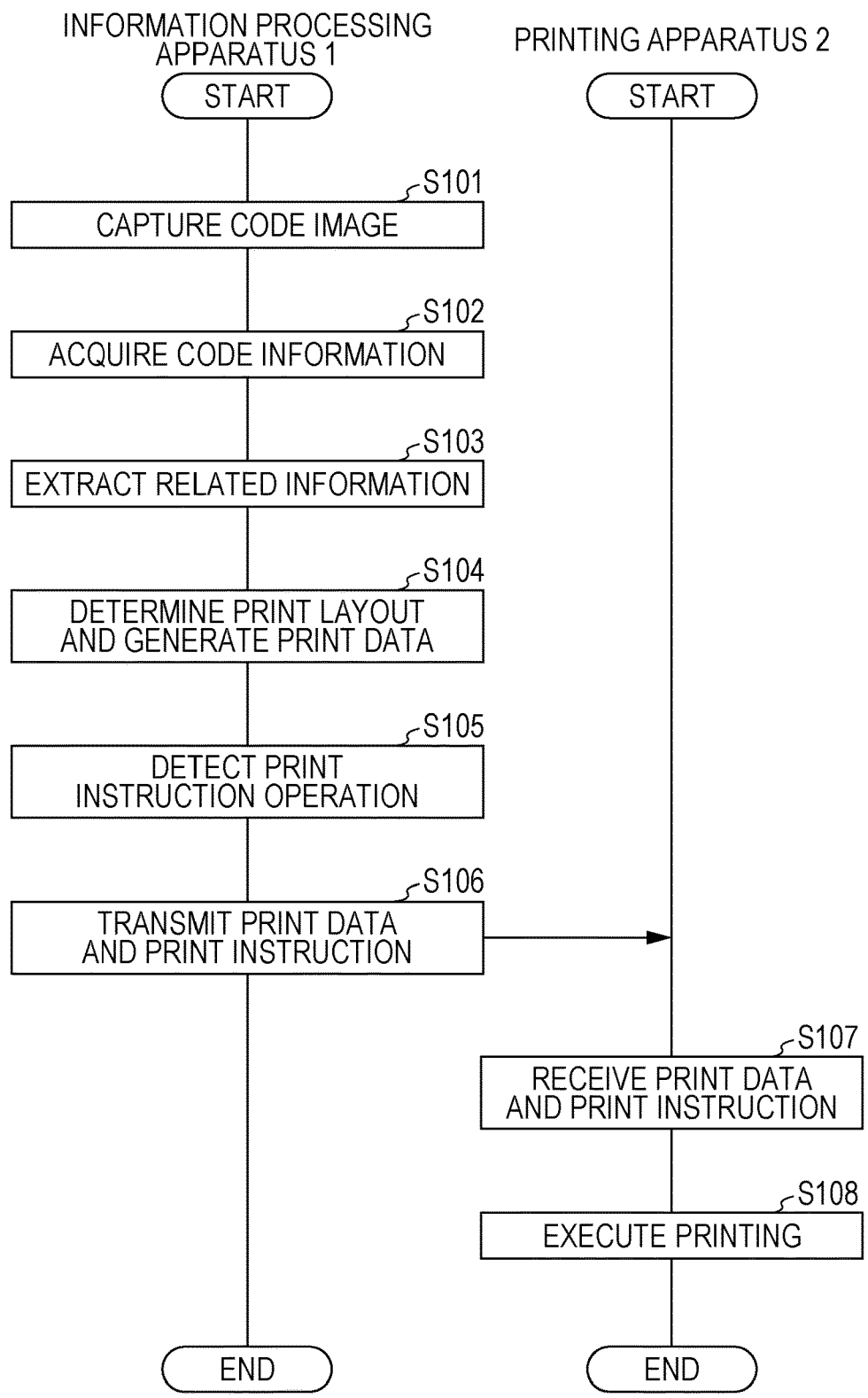
FIG. 6 is a flowchart illustrating a flow when the printing system of the first embodiment prints a code related label.

With reference to FIG. 6, a flow when the printing system Sy1 prints a code related label L1 will be described, also referring to FIG. 4.

In step S101, the information processing apparatus 1 is held close to the code image G1 provided in the product by an operator, and the image capturing unit 103 captures the code image G1.

In step S102, the code information acquisition unit 105 acquires code information by reading code information in the captured code image G1.

In step S103, the local extraction unit 106 refers to the local database 104 and extracts related information associated with the acquired code information.

In step S104, the print data generation unit 107 generates print data based on the code information acquired in step S102, and the related information extracted in step S103. Here, the print data generation unit 107 generates print data after determining a print layout depending on whether photograph image data is included in the related information in accordance with the extracted related information. Here, the display unit 101 may display a print image of the code related label L1 based on the generated print data.

In step S105, if the detection unit 102 detects a print instruction operation, the process proceeds to step S106 and the print transmission unit 108 transmits the generated print data and a print instruction to the printing apparatus 2. As the print instruction operation, the detection unit 102 detects an operation of the operator touching a printing icon displayed on the display unit 101, for example.

In step S107, the print receiving unit 201 receives the print data and the print instruction transmitted from the printing apparatus 2.

In step S108, the printing unit 202 executes printing based on the received print data and the received print instruction. In this manner, the code related label L1 in which the code image G1 and the related image G2 related to the code image G1 are printed (see FIG. 1) is created.

In the printing system Sy1 of the first embodiment, since the related information is extracted from the local database 104 provided in the information processing apparatus 1, the type of the code image G1 to be printed may be an in-store code, for example. The type of the code image G1 is not limited to the in-store code, and other types of code images G1 may also be used.

As described above, the information processing apparatus 1 in the printing system Sy1 of the first embodiment includes the code information acquisition unit 105, the local database 104, the local extraction unit 106, and the print data generation unit 107. The code information acquisition unit 105 acquires code information which indicates the code image G1. Code information and related information are stored in association with each other in the local database 104. The local extraction unit 106 refers to the local database 104 and extracts the related information associated with the code information acquired by the code information acquisition unit 105. The print data generation unit 107 generates the print data based on the related information extracted from the local database 104. According to this configuration, when the code information is acquired, the local database 104 is referred to, and the related information associated with the acquired code information is extracted. Then, the print data is generated based on the extracted related information.

Figure 7:
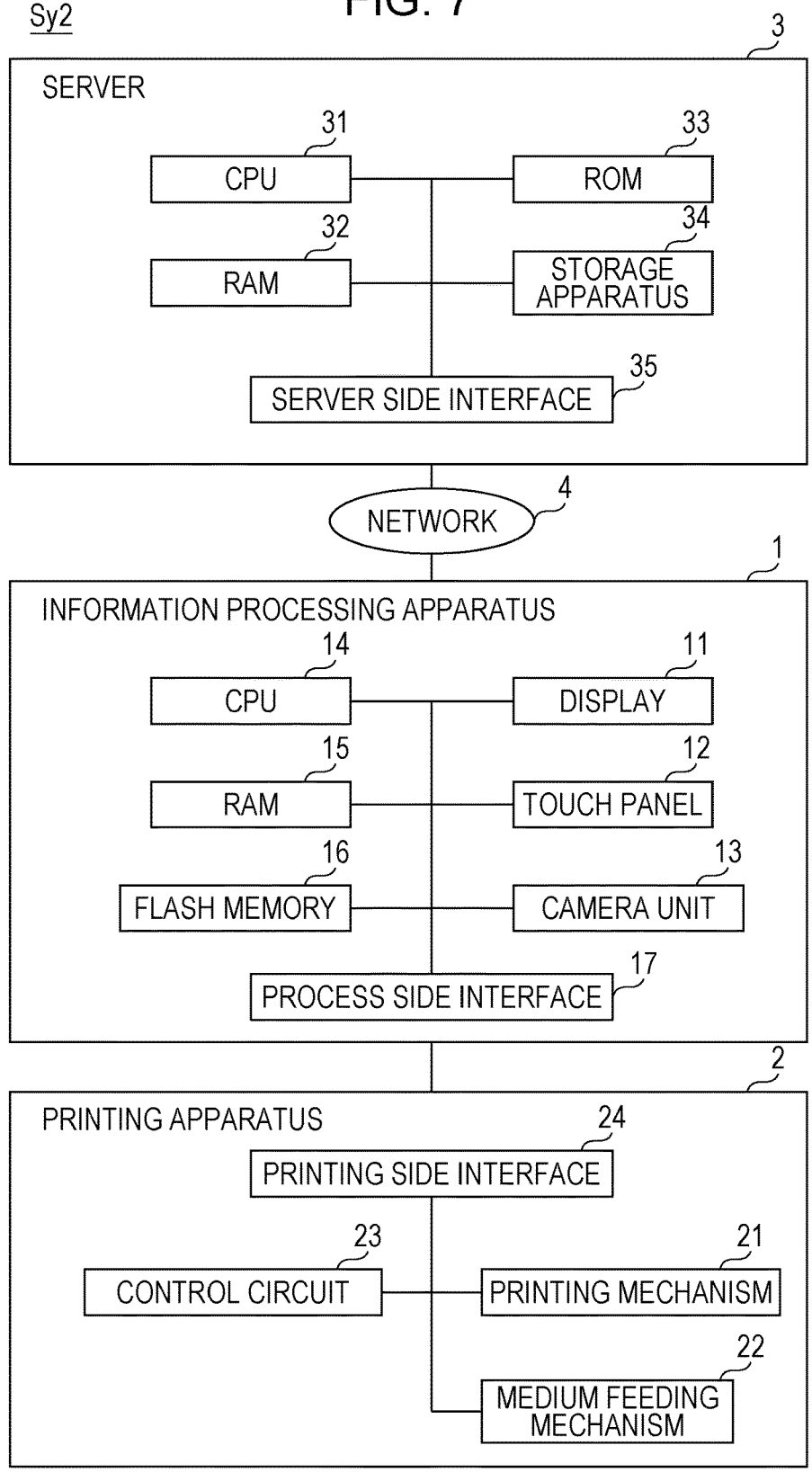
FIG. 7 is a block diagram illustrating a hardware configuration of a printing system according to a second embodiment.

With reference to FIG. 7, a hardware configuration of a printing system Sy2 of a second embodiment will be described. In the second embodiment and the subsequent embodiments, description will be omitted about the same contents as those described in the already described embodiment, and differences will be described mainly.

The printing system Sy2 includes a server 3 in addition to an information processing apparatus 1 and a printing apparatus 2. The server 3 is connected to the information processing apparatus 1 via a network 4, such as the Internet, so as to communicate with each other. The information processing apparatus 1 generates print data based on related information extracted from a server database 301 (see FIG. 8) (in place of the local database 104) provided in the server 3.

The server 3 includes a CPU 31, RAM 32, read only memory (ROM) 33, a storage apparatus 34, and a server side interface 35. The CPU 31 executes various programs stored in the ROM 33 or the storage apparatus 34 using the RAM 32. The storage apparatus 34 may be a hard disk drive, for example.

Figure 8:
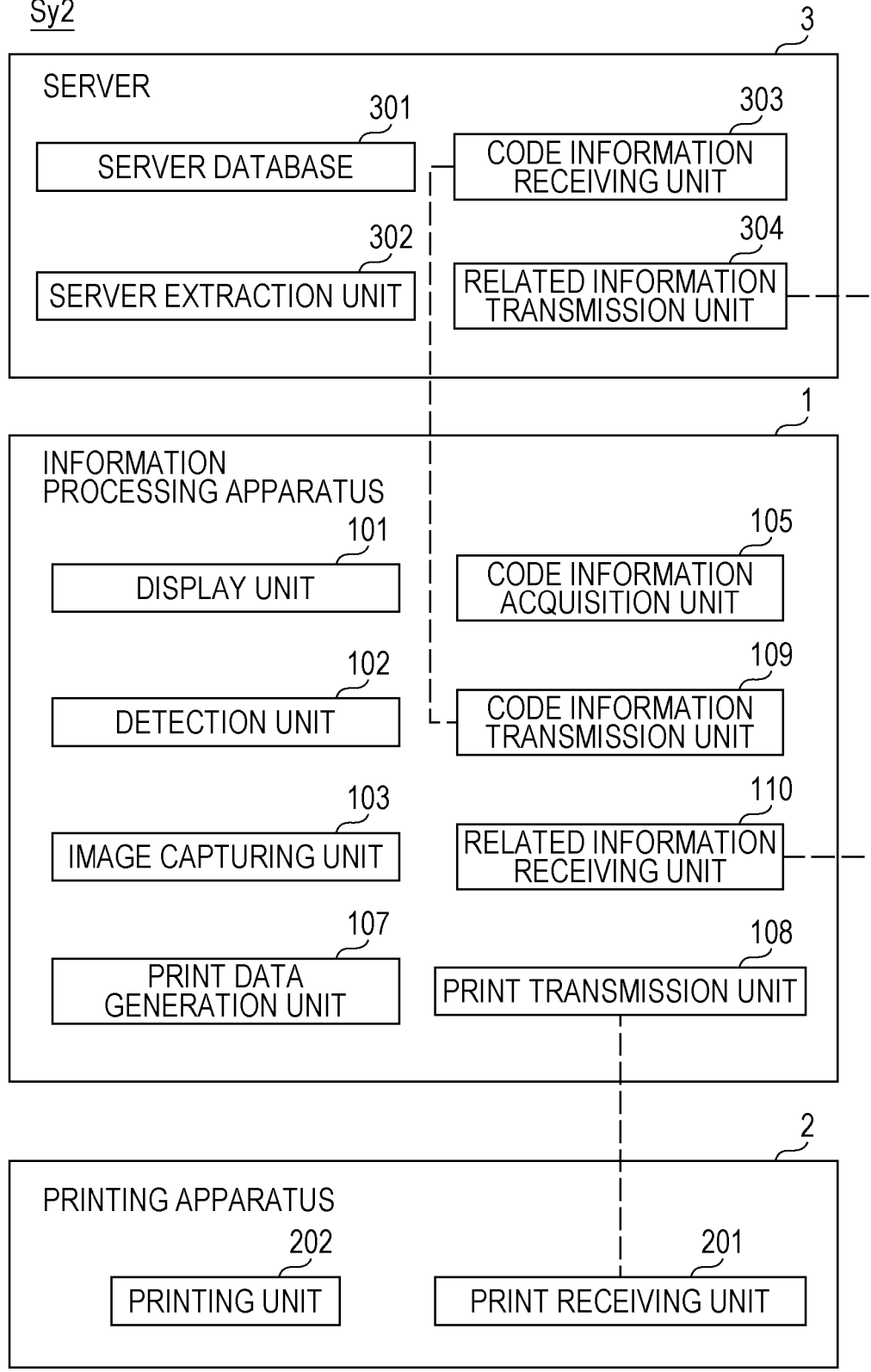
FIG. 8 is a block diagram illustrating a functional configuration of the printing system according to the second embodiment.

A functional configuration of the printing system Sy2 will be described with reference to FIG. 8. The information processing apparatus 1 in the printing system Sy2 is substantially the same as that of the printing system Sy1, however, the information processing apparatus 1 in the printing system Sy2 further includes a code information transmission unit 109 and a related information receiving unit 110, and excludes the local database 104 and the local extraction unit 106. The code information transmission unit 109 and the related information receiving unit 110 are implemented by a process side interface 17.

The server 3 includes a server database 301, a server extraction unit 302, a code information receiving unit 303, and a related information transmission unit 304. The server database 301 is provided in the storage apparatus 34. Code information and related information are stored in association with each other in the server database 301 (see FIG. 5) in the same manner as in the local database 104. The server extraction unit 302 is implemented when the CPU 31 executes a program, however, the server extraction unit 302 may be implemented only by a hardware resource. The code information receiving unit 303 and the related information transmission unit 304 are implemented by a server side interface 35.

Figure 9:
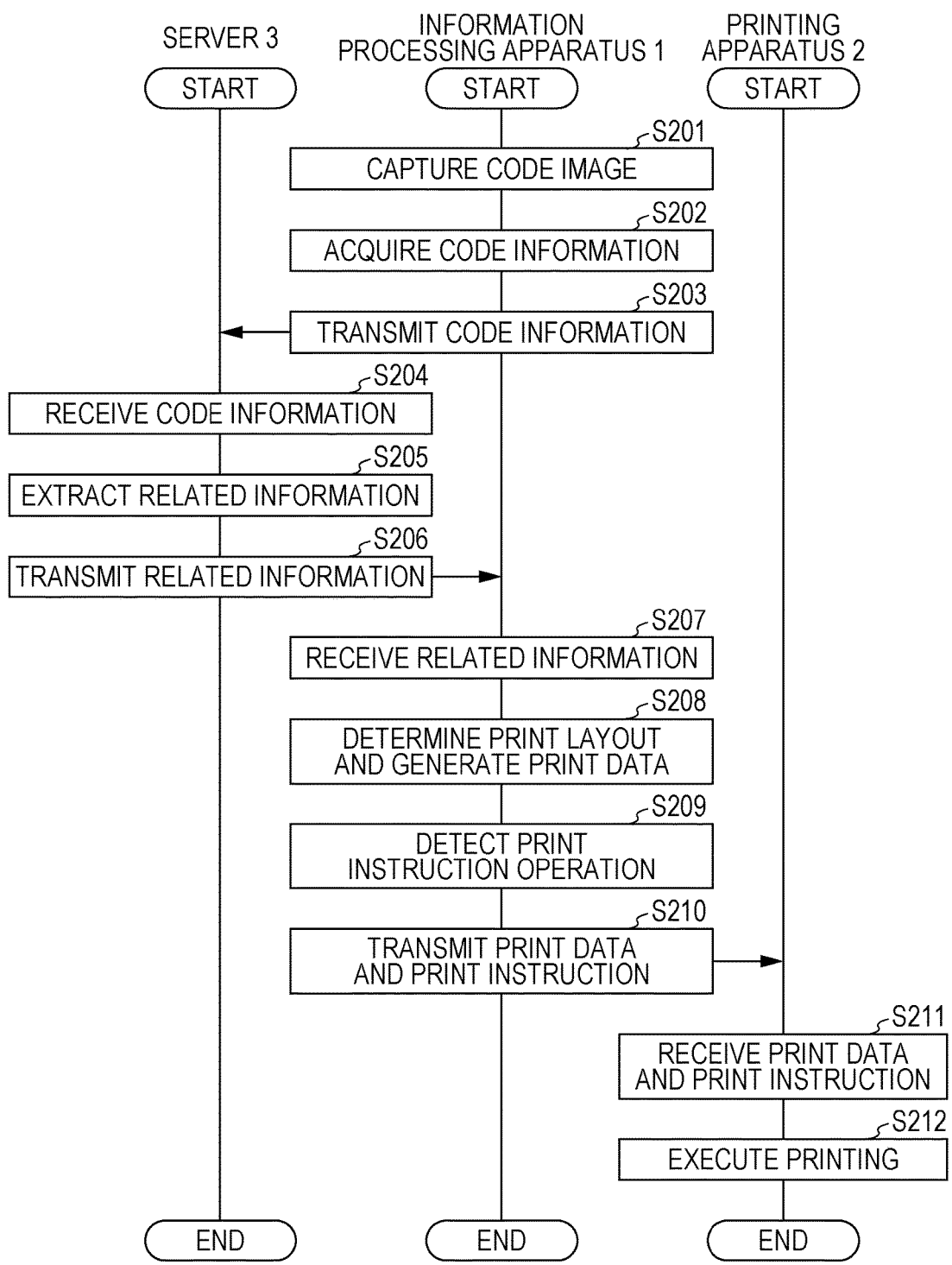
FIG. 9 is a flowchart illustrating a flow when the printing system according to the second embodiment prints a code related label.

With reference to FIG. 9, a flow when the printing system Sy2 prints a code related label L1 will be described, also referring to FIG. 8.

Steps S201 and S202 are performed in the same manner as in step S101 and step S102.

The process proceeds to step S203 and the code information transmission unit 109 transmits code information acquired in step S202 to the server 3.

In step S204, the code information receiving unit 303 receives the transmitted code information.

In step S205, the server extraction unit 302 refers to the server database 301 and extracts related information associated with the received code information.

In step S206, the related information transmission unit 304 transmits the extracted related information to the information processing apparatus 1.

In step S207, the related information receiving unit 110 receives the transmitted related information.

In step S208, the print data generation unit 107 generates print data based on the code information acquired in step S202 and related information received in step S207. The print data generation unit 107 generates print data after determining a print layout depending on the extracted related information described above.

Hereinafter, steps S209 to S212 are performed in the same manner as in steps S105 to S108.

In the printing system Sy2 of the second embodiment, since the related information is extracted from the server database 301 provided in the server 3, the type of the code image G1 to be printed may be a code for general distribution, for example. The type of the code image G1 is not limited to the code for general distribution, and other types of code images G1 may also be used.

For the communication between the information processing apparatus 1 and the server 3, a Web Application Programming Interface (API) may be used. In this case, a two-dimensional code image linked to a product website of a company which discloses a Web API may be printed as a related image G2. That is, two-dimensional code information corresponding to a two-dimensional code image may be stored in the server database 301 as the related information.

As described above, the information processing apparatus 1 in the printing system Sy2 of the second embodiment includes the code information acquisition unit 105, the code information transmission unit 109, the related information receiving unit 110, and the print data generation unit 107. The code information transmission unit 109 is connected to the information processing apparatus 1 via a network 4, and transmits code information acquired by the code information acquisition unit 105 to the server 3 in which the server database 301 is provided. The related information receiving unit 110 receives the related information extracted from the server database 301 and then transmitted based on the code information received by the server 3. The print data generation unit 107 generates print data based on the received related information. According to this configuration, when the code information is acquired, the acquired code information will be transmitted to the server 3. When the code information is received by the server 3, related information will be extracted from the server database 301 based on the received code information, and the extracted related information will be transmitted to the information processing apparatus 1. When the related information is received in the information processing apparatus 1, print data will be generated based on the received related information.

Figure 10:
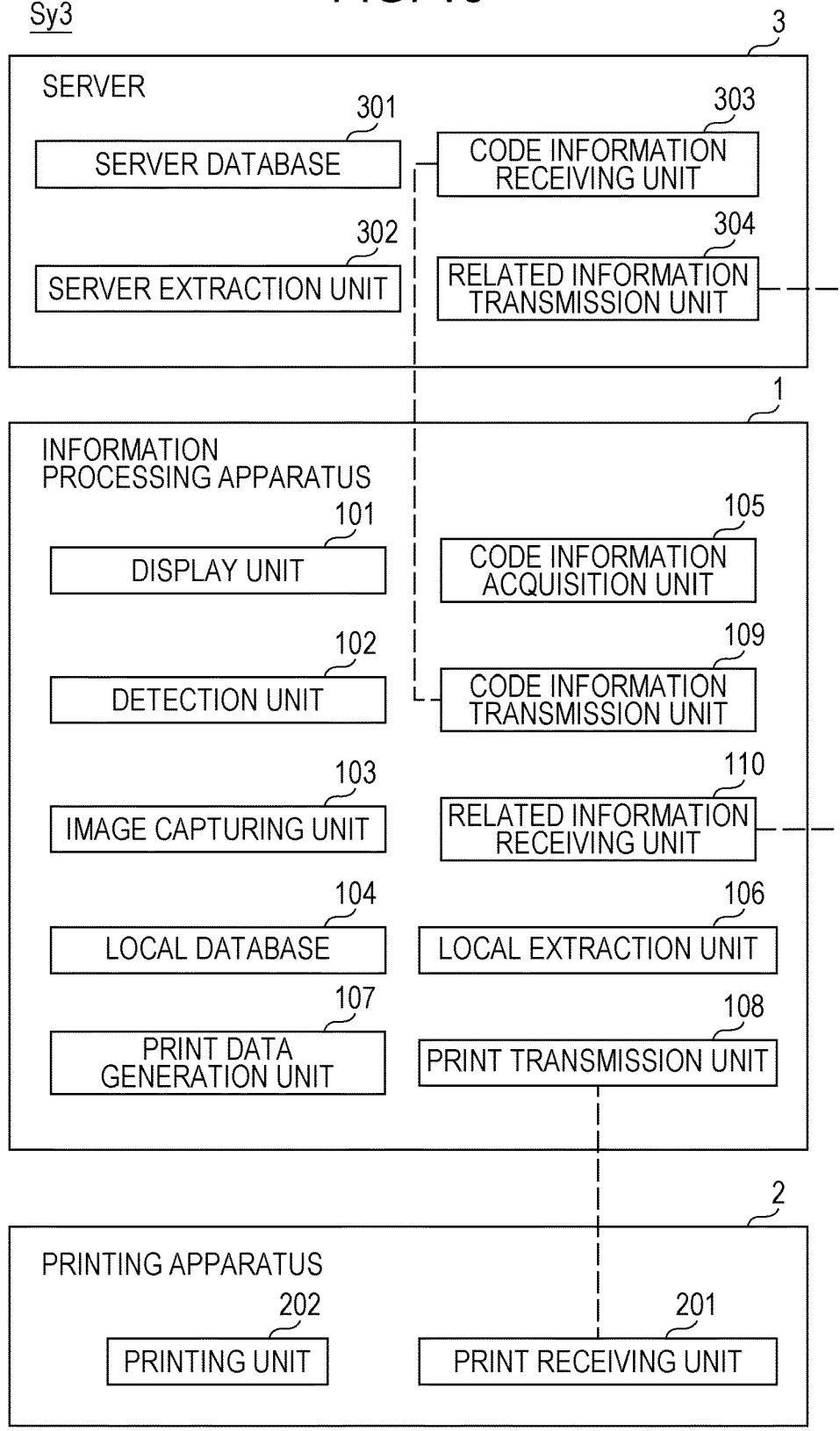
FIG. 10 is a block diagram illustrating a functional configuration of a printing system according to a third embodiment.

With reference to FIG. 10, a functional configuration of a printing system Sy3 of a third embodiment will be described. A functional configuration of the printing system Sy3 is the same as that of the printing system Sy2 except that an information processing apparatus 1 further includes a local database 104 and a local extraction unit 106. That is, the printing system Sy3 includes both the local database 104 and the server database 301. Here, for ease of description, code information and related information about an in-store code are stored in the local database 104, and code information and related information about a code for general distribution are stored in the server database 301. However, this configuration is not restrictive. Although not illustrated, a hardware configuration of the printing system Sy3 is the same as that of the printing system Sy2.

Figure 11:
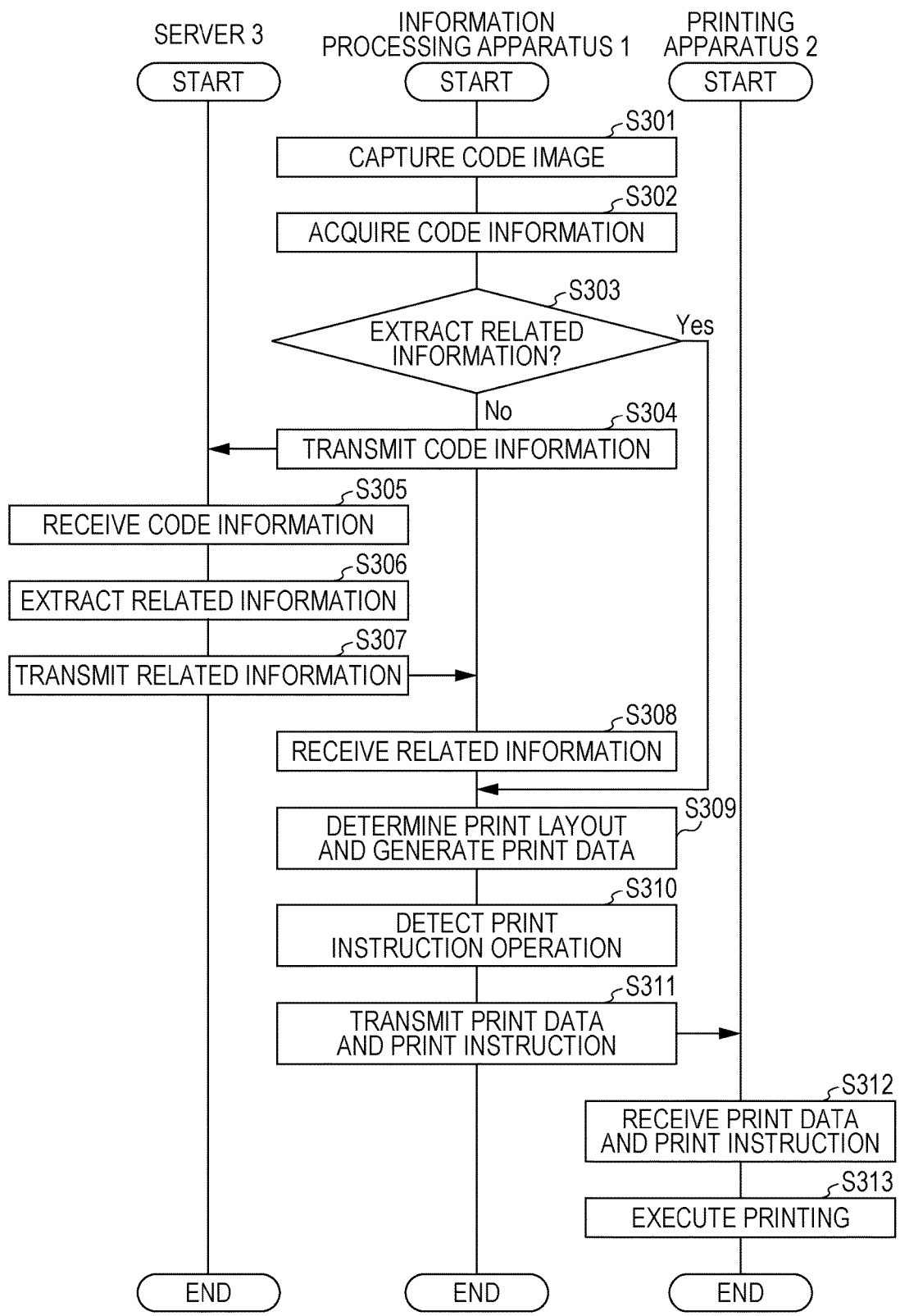
FIG. 11 is a flowchart illustrating a flow when the printing system according to the third embodiment prints a code related label.

With reference to FIG. 11, a flow when the printing system Sy3 prints a code related label L1 will be described, also referring to FIG. 10.

Steps S301 and S302 are performed in the same manner as in steps S101 and S102.

The process proceeds to step S303 and the local extraction unit 106 refers to the local database 104.

In step S303, if the local extraction unit 106 refers to the local database 104 and extracts related information associated with the code information acquired in step S302 (S303: Yes), the process proceeds to step S309. For example, if the acquired code information is an in-store code, since the related information is extracted from the local database 104, the process proceeds to step S309. Hereinafter, steps S309 to S313 are performed in the same manner as in steps S104 to S108.

By contrast, in step S303, if the local extraction unit 106 refers to the local database 104 and cannot extract related information because no related information associated with the code information acquired in step S302 is stored in the local database 104 (S303: No), the process proceeds to step S304. For example, if the acquired code information is a code for general distribution, since the related information is not extracted from the local database 104, the process proceeds to step S304. Hereinafter, steps S304 to S313 are performed in the same manner as in steps S203 to S212.

As described above, the information processing apparatus 1 in the printing system Sy3 of the third embodiment includes the code information acquisition unit 105, the local database 104, the local extraction unit 106, the print data generation unit 107, the code information transmission unit 109, and the related information receiving unit 110. After the code information acquisition unit 105 acquires the code information, the local extraction unit 106 refers to the local database 104. If no related information is extracted from the local database 104 by the local extraction unit 106, the code information transmission unit 109 transmits the code information to the server 3. According to this configuration, the local database 104 is preferentially referred to between the local database 104 and the server database 301. Therefore, the related information can be efficiently extracted. For example, if the acquired code information is an in-store code, since the local database 104 is referred to and the related information is extracted from the local database 104, the server database 301 is not referred to. If the acquired code information is a code for general distribution, the local database 104 is referred to first, however, since no related information is extracted from the local database 104, the server database 301 is referred to next and the related information is extracted from the server database 301.

Figure 12:
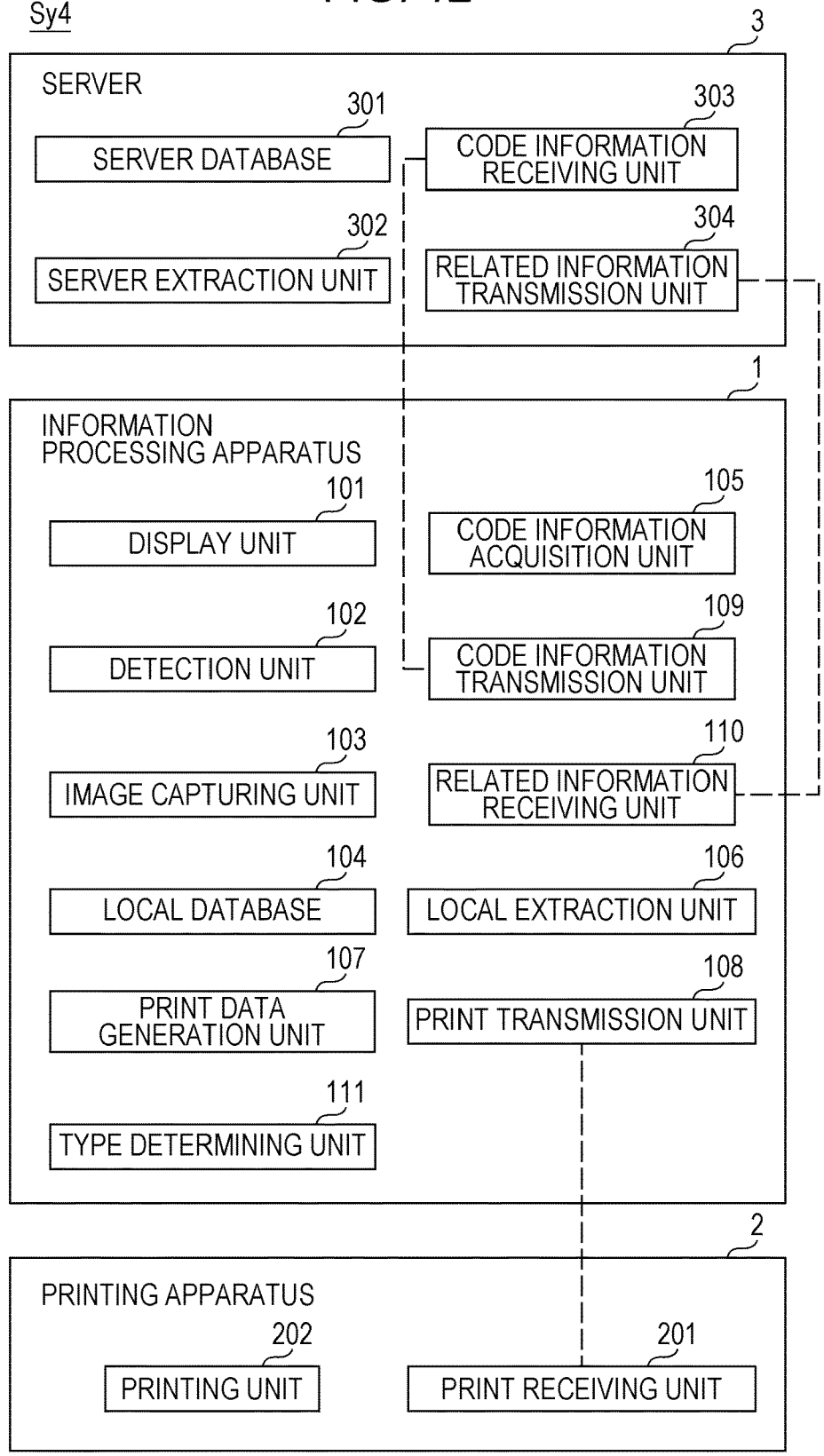
FIG. 12 is a block diagram illustrating a functional configuration of a printing system according to a fourth embodiment.

With reference to FIG. 12, a functional configuration of a printing system Sy4 of a fourth embodiment will be described. A functional configuration of the printing system Sy4 is the same as that of the printing system Sy3 except that an information processing apparatus 1 includes a type determining unit 111. Here, for ease of description, code information and related information about an in-store code are stored in a local database 104, and code information and related information about a code for general distribution are stored in a server database 301. However, this configuration is not restrictive. Although not illustrated, a hardware configuration of the printing system Sy4 is the same as those of the printing system Sy2 and the printing system Sy3.

Figure 13:
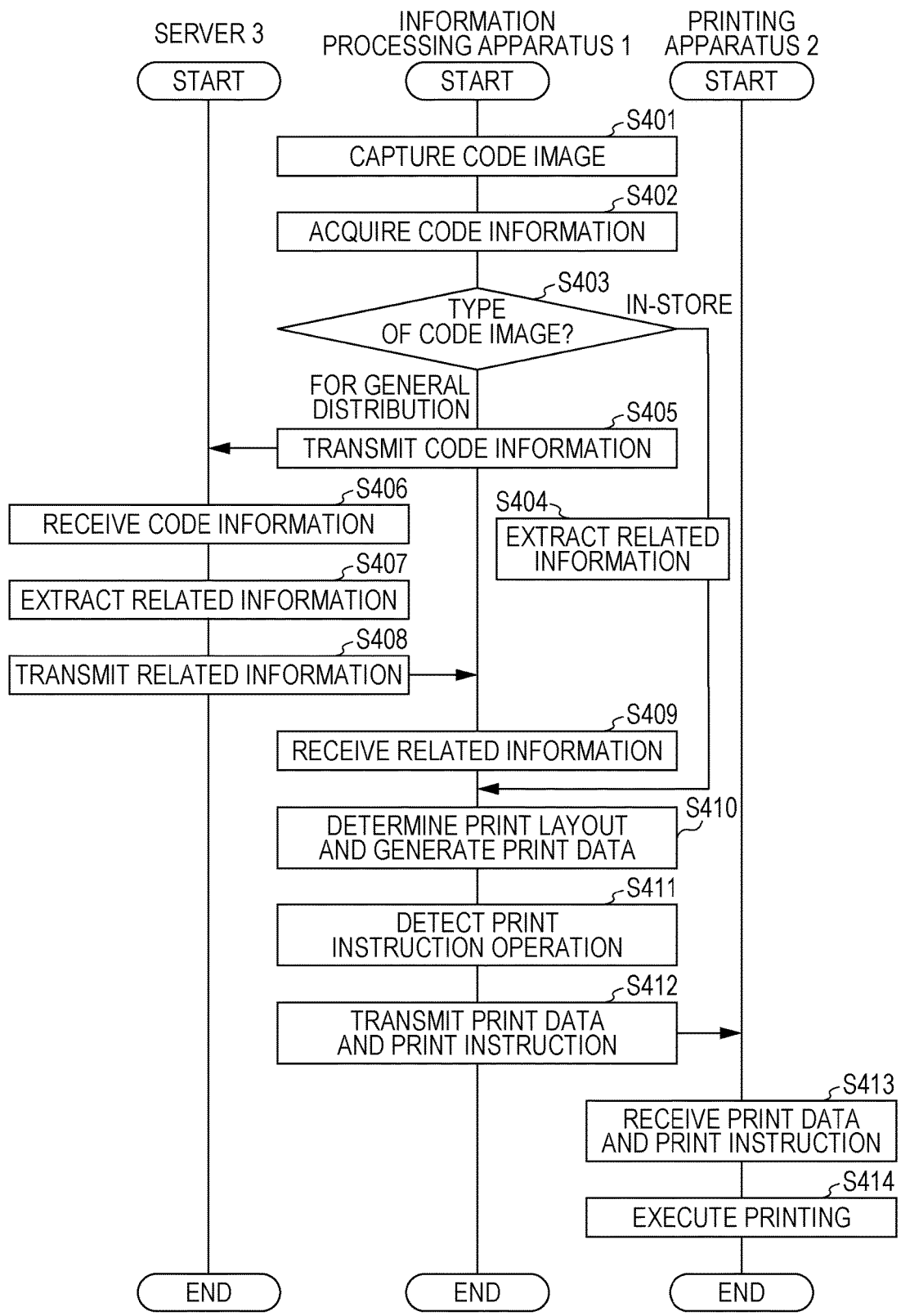
FIG. 13 is a flowchart illustrating a flow when the printing system according to the fourth embodiment prints a code related label.

With reference to FIG. 13, a flow when the printing system Sy4 prints a code related label L1 will be described, also referring to FIG. 12.

Steps S401 and step S402 are performed in the same manner as in steps S101 and S102.

The process proceeds to step S403 and the type determining unit 111 determines the type of the code image G1 captured in step S401 based on the code information acquired in step S402. The type determining unit 111 refers to a country code included in the code information, for example. If the country code is a code assigned to the in-store code, the type determining unit 111 determines that the code is an in-store code, and if the country code is a code assigned to each country, the type determining unit 111 determines that the code is a code for general distribution.

If the type of the code image G1 determined in step S403 is an in-store code, the process proceeds to step S404. Hereinafter, steps S404, and S410 to S414 are performed in the same manner as in steps S103 to S108.

If the type of the code image G1 determined in step S403 is a code for general distribution, the process proceeds to step S405. Hereinafter, steps S405 to S414 are performed in the same manner as in steps S203 to S212.

As described above, the information processing apparatus 1 in the printing system Sy4 of the fourth embodiment includes the code information acquisition unit 105, the local database 104, the local extraction unit 106, the print data generation unit 107, the code information transmission unit 109, the related information receiving unit 110, and the type determining unit 111. The type determining unit 111 determines the type of the code image G1 based on the code information acquired by the code information acquisition unit 105. In accordance with the type of the code image G1 determined by the type determining unit 111, whether the local extraction unit 106 refers to the local database 104 or the code information transmission unit 109 transmits the code information to the server 3 is switched. According to this configuration, the database in accordance with the type of the code image G1 is referred to between the local database 104 and the server database 301, and the related information is extracted from that database. Therefore, related information can be efficiently extracted. For example, if it is determined that the acquired code information is an in-store code, the local database 104 is referred to and the related information is extracted from the local database 104. If it is determined that the acquired code information is a code for general distribution, the server database 301 is referred to and the related information is extracted from the server database 301.

Figure 14:
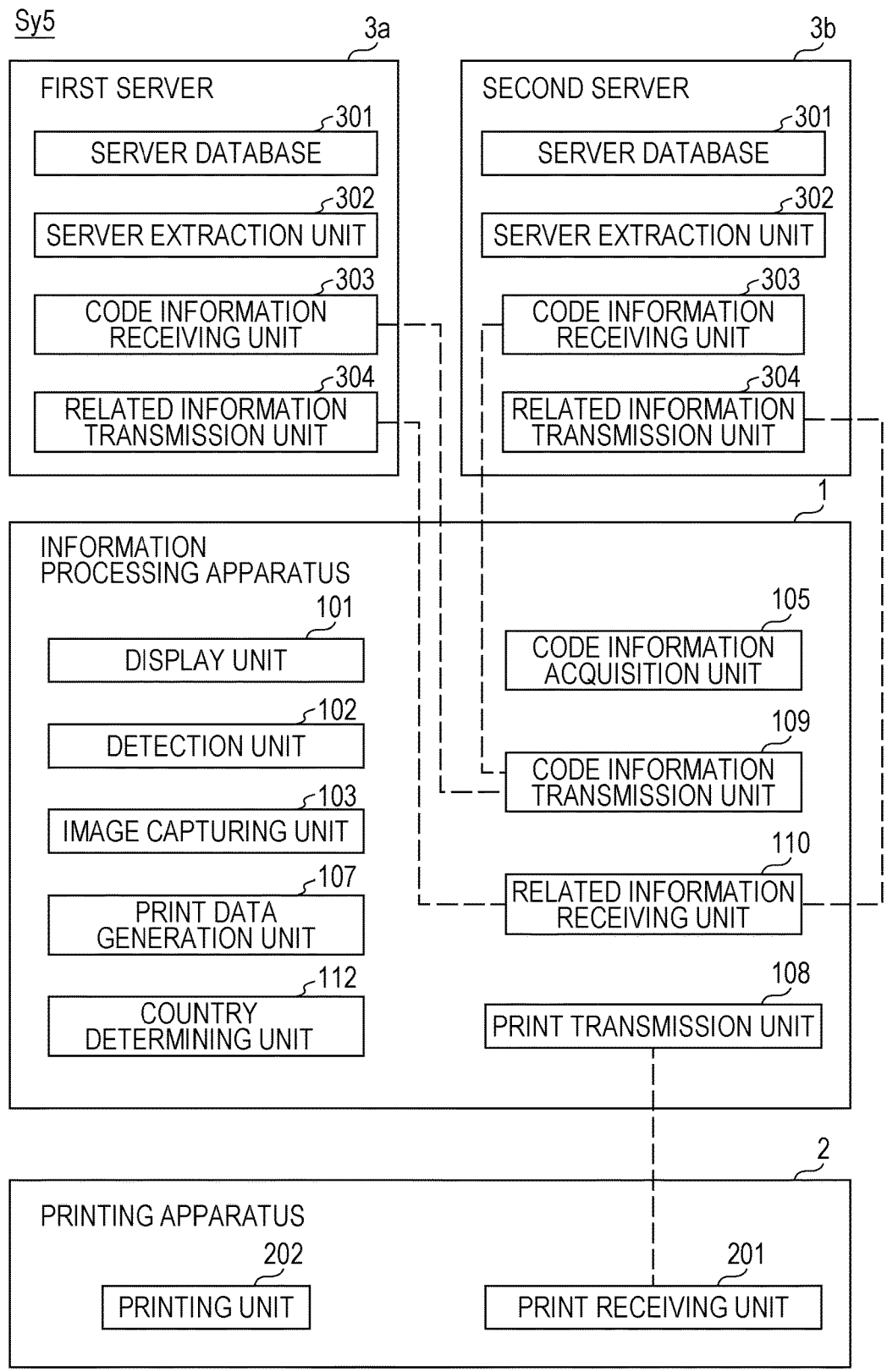
FIG. 14 is a block diagram illustrates a functional configuration of a printing system according to a fifth embodiment.

With reference to FIG. 14, a functional configuration of a printing system Sy5 of a fifth embodiment will be described. The functional configuration of the printing system Sy5 is the same as the functional configuration of the printing system Sy2 except that the printing system Sy5 includes a plurality of servers 3, and an information processing apparatus 1 includes a country determining unit 112. Server databases 301 corresponding to different countries are provided in a plurality of servers 3. That is, code information to which a different country code is assigned and related information associated with the code information are stored in each of a plurality of the server databases 301. Here, for the ease of description, code information to which a country code of A country is assigned is stored in the server database 301 of a first server 3a, and code information to which a country code of B country is assigned is stored in the server database 301 of a second server 3b. However, this configuration is not restrictive. A hardware configuration of the printing system Sy5 is the same as that of the printing system Sy2 except that the printing system Sy5 includes a plurality of servers 3 although not illustrated.

Figure 15:
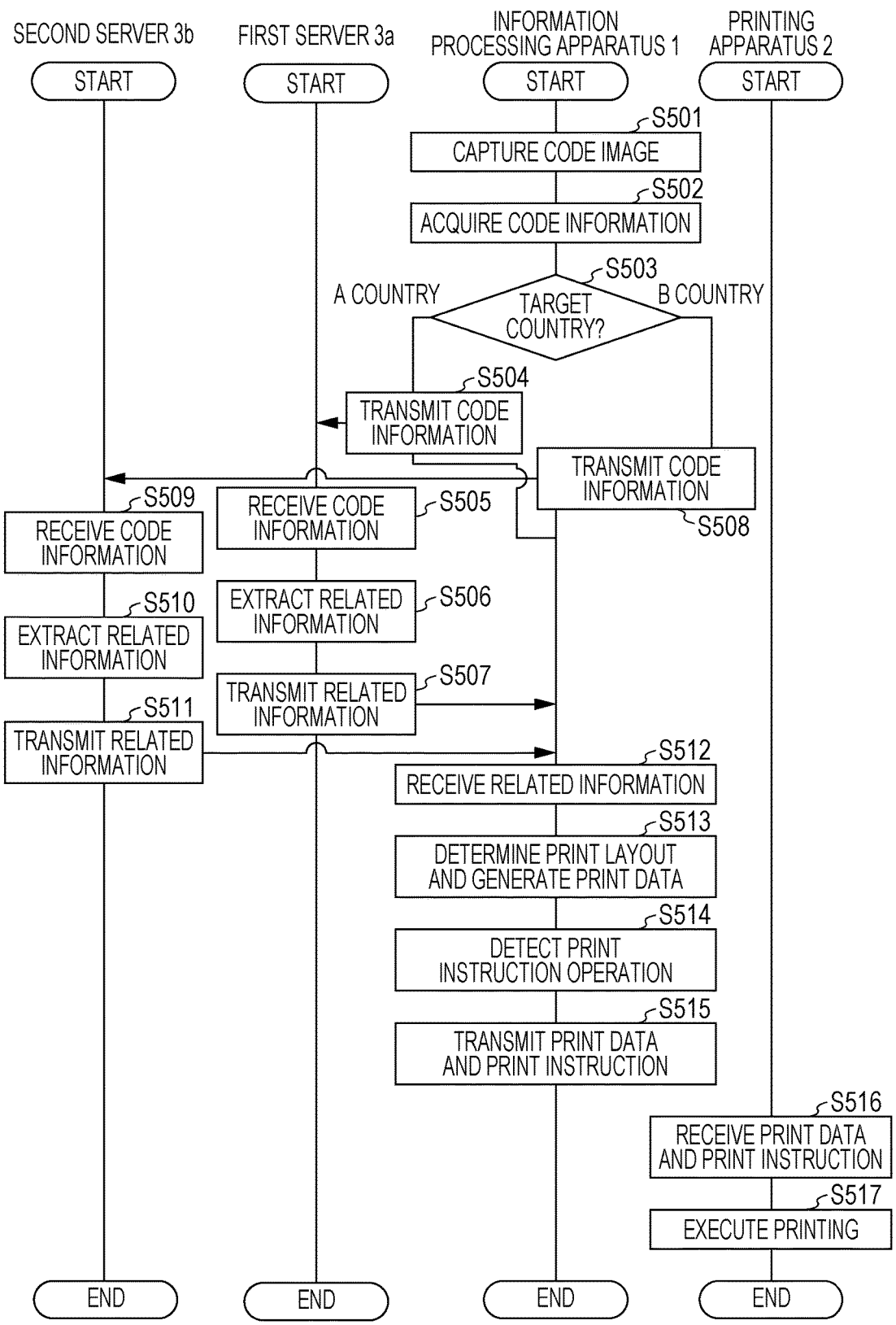
FIG. 15 is a flowchart illustrating a flow when the printing system according to the fifth embodiment prints a code related label.

With reference to FIG. 15, a flow when the printing system Sy5 prints a code related label L1 will be described, also referring to FIG. 14.

Steps S501 and S502 are performed in the same manner as in steps S501 and S502.

The process proceeds to step S503 and the country determining unit 112 determines a target country of the code image G1 captured in step S401 based on the country code included in the code information acquired in step S502.

If the target country of the code image G1 determined in step S503 is A country, the process proceeds to step S504.

In step S504, the code information transmission unit 109 transmits the code information acquired in step S502 to the first server 3a. Hereinafter, in the first server 3a, after steps S505 to S507 are performed in the same manner as in steps S204 to S206, the process proceeds to step S512.

If the target country of the code image G1 determined in step S503 is B country, the process proceeds to step S508.

In step S508, the code information transmission unit 109 transmits the code information acquired in step S502 to the second server 3b. Hereinafter, in the second server 3b, after steps S509 to S511 are performed in the same manner as in steps S204 to S206, the process proceeds to step S512.

Hereinafter, steps S512 to S517 are performed in the same manner as in steps S207 to S212.

As describe above, the information processing apparatus 1 in the printing system Sy5 of the fifth embodiment includes the code information acquisition unit 105, the code information transmission unit 109, the related information receiving unit 110, the print data generation unit 107, and the country determining unit 112. The country determining unit 112 determines the target country of the code image G1 based on the code information acquired by the code information acquisition unit 105. The code information transmission unit 109 transmits the code information to a server 3 in which the server database 301 corresponding to the target country of the code image G1 determined by the country determining unit 112 is provided among a plurality of servers 3. According to this configuration, a server database 301 corresponding to the target country of the code image G1 determined by the country determining unit 112 among a plurality of server databases 301 is referred to, and related information is extracted from that server database 301. Therefore, related information can be efficiently extracted.

As described above, each of the information processing apparatuses 1 in the printing systems Sy1 to Sy5 of the first embodiment to the fifth embodiment includes the code information acquisition unit 105 and the print data generation unit 107. The code information acquisition unit 105 acquires code information which indicates the code image G1. The print data generation unit 107 generates print data based on the related information extracted based on the code information acquired by the code information acquisition unit 105 from the local database 104 or the server database 301 in which the code information and the related information are stored in association with each other. Each of the printing systems Sy1 to Sy5 includes the information processing apparatus 1 and the printing apparatus 2. The information processing apparatus 1 includes the code information acquisition unit 105, the print data generation unit 107, and the print transmission unit 108. The print transmission unit 108 transmits print data generated by the print data generation unit 107 and a print instruction to the printing apparatus 2. The printing apparatus 2 executes printing in accordance with the print data and the print instruction transmitted by the information processing apparatus 1. According to this configuration, when the code information is acquired, print data will be generated based on the related information associated with the acquired code information. Therefore, a related image G2 corresponding to the related information will be included in an image printed based on the generated print data. The related image G2 will be related to the code image G1 which indicates the acquired code information. Therefore, printing of the related image G2 which is not related to the code image G1 can be avoided.

The information processing apparatus 1 further includes the print transmission unit 108. The print transmission unit 108 transmits the print data generated by the print data generation unit 107 and the print instruction to the printing apparatus 2. According to this configuration, the generated print data and the print instruction are transmitted from the information processing apparatus 1 and, thereby, acquired by the printing apparatus 2. Therefore, the printing apparatus 2 can be made to start printing easily.

The information processing apparatus 1 further includes the detection unit 102 which detects a print instruction operation. The print transmission unit 108 transmits the print data and the print instruction to the printing apparatus 2 when the detection unit 102 detects a print instruction operation. According to this configuration, when the operator performs a print instruction operation, that print instruction operation will be detected and the print data and the print instruction will be transmitted to the printing apparatus 2. Therefore, the printing apparatus 2 can be made to execute printing at desirable timing for the operator.

In the information processing apparatus 1, the code information acquisition unit 105 acquires code information by reading the code information in the code image G1. According to this configuration, erroneous input can be avoided as compared with a case in which the code information is acquired by making an operator input the code information, and time and effort for inputting the code information can be saved.

In the information processing apparatus 1, the print data generation unit 107 generates print data based on the related information and the code information acquired by the code information acquisition unit 105. According to this configuration, in addition to the related image G2, the code image G1 related to the related image G2 is included in the image printed based on the generated print data. Therefore, the printing apparatus 2 can be made to print a code related label L1 in which the code image G1 and the related image G2 are integrated.

The supported application causes the computer to function as the information processing apparatus 1. According to this configuration, a computer can be made to function as the information processing apparatus 1 in which printing of the related image G2 which is not related to the code image G1 can be avoided.

The invention is not limited to the embodiments described above and various configurations can be employed without departing from the scope of the invention. For example, the present embodiment can be modified into the following forms.

The display unit 101 may display the type of the code image G1 determined by the type determining unit 111. According to this configuration, the operator can check the type of the code image G1 corresponding to the acquired code information, that is, the code image G1 captured by the image capturing unit 103. Therefore, for example, if the type of the displayed code image G1 is not a desirable type, the operator can perform an operation to change the type of the code image G1 so that the code image G1 of the desirable type may be printed. The display unit 101 is an example of a "report unit." The information processing apparatus 1 may include a sound output unit which outputs the type of the code image G1 with sound as the "report unit", for example.

The detection unit 102 detects an operation of the operator touching a printing icon displayed on the display unit 101 as the print instruction operation, however, the operation is not limited to the same. For example, an operation of the operator holding the information processing apparatus 1 close to the code image G1 provided in a product, or the like again after the print data is generated may be defined as a print instruction operation. In this case, the code information acquisition unit 105 functions as the detection unit 102. That is, when the code information acquisition unit 105 acquires the same code information as the code information acquired first, the code information acquisition unit 105 detects that a print instruction operation is performed. The timing at which the print transmission unit 108 transmits the print data and the print instruction is not limited when the print instruction operation is detected by the detection unit 102, however, the print data and the print instruction may be automatically transmitted after the print data is generated.

The code information acquisition unit 105 acquires code information by reading the code information from the captured code image G1, however, acquisition of the code information is not limited to the same. For example, the code information acquisition unit 105 may acquire the code information based on input information input from a software keyboard displayed on the display unit 101, or sound information recognized by a sound recognition function.

The print data generation unit 107 may generate print data based not only on both the code information and the related information but also only on the related information. In that case, a code related label L1 in which the code image G1 is not printed but only the related image G2 is printed is created. Also about such a code related label L1, by sticking, for example, the code related label L1 next to a code image G1 provided in, for example, a product, it is possible to make a person who sees the code image G1 and the code related label L1 recognize the object specified by the code information indicated by the code image G1. Therefore, convenience can be improved. Further, whether the print data generation unit 107 generates the print data from both the code information and the related information or generates the print data only from the related information may be selected by the operator.

Figure 16:
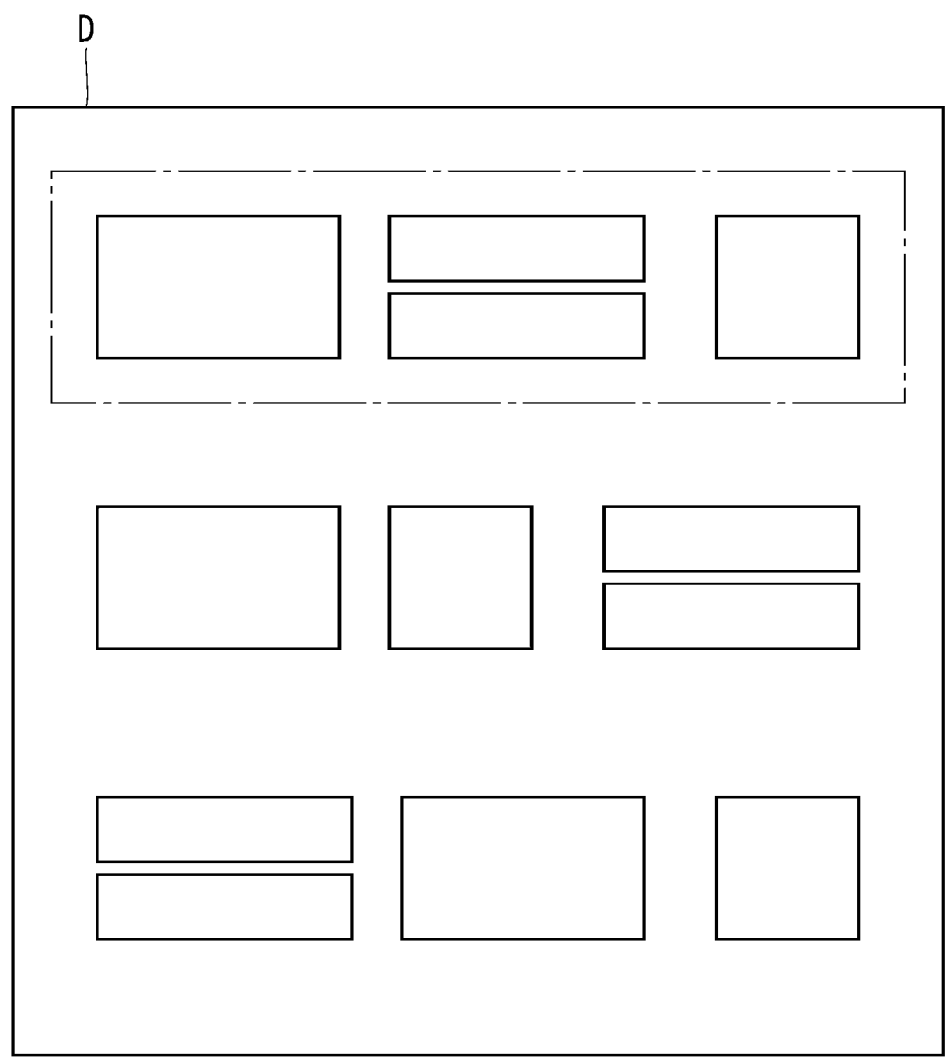
FIG. 16 illustrates a layout selection screen.

The detection unit 102 may detect a selection operation to select one layout from among a plurality of layouts which define arrangement of the related image G2 and the code image G1. For example, in a layout selection screen D (see FIG. 16) displayed on the display unit 101, the detection unit 102 may detect a selection operation of the operator touching and selecting one layout from among a plurality of layouts. The number of options of the layout selection screen D to be displayed on the display unit 101 may be increased or reduced depending on the size of the printing medium placed on the printing apparatus 2, for example, a width of a tape member or a length of a label set by the user. In this case, the print data generation unit 107 generates print data in the selected layout based on the detection result of the selection operation by the detection unit 102. Therefore, the operator can be made to select a layout in which the arrangement of the related image G2 and the code image G1 is defined.

Figure 17:
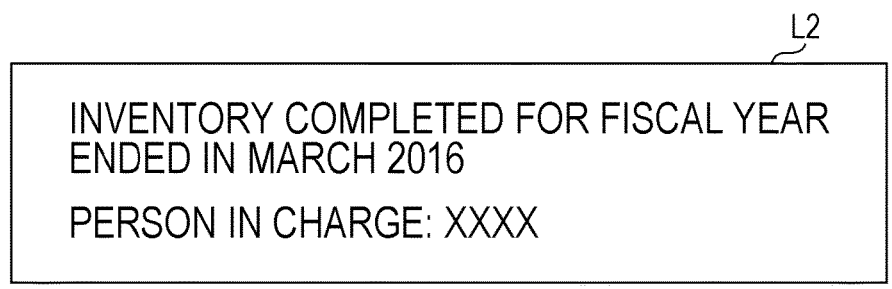
FIG. 17 illustrates an inventory label to be printed by a printing system.

The code related label L1 illustrated in FIG. 1 is used during inventory, for example. In this case, after the product is checked by the operator, the information processing apparatus 1 is held close to the code image G1 printed on the code related label L1 by the operator, and when the code information acquisition unit 105 acquires the code information from the code image G1, the print data generation unit 107 will generate print data indicating that inventory has been completed. Then the printing apparatus 2 prints an inventory-completed label L2 as illustrated in FIG. 17.

Figure 18:
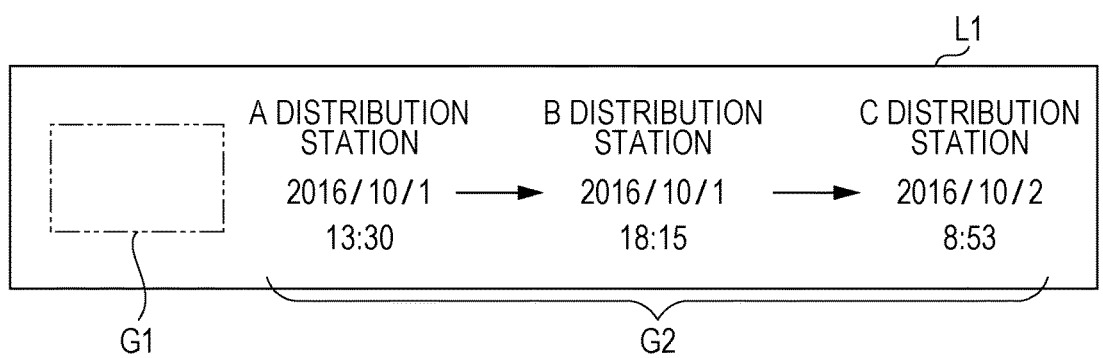
FIG. 18 illustrates a code related label to be printed when a printing system is applied to a parcel delivery service.
Figures 19, 20:
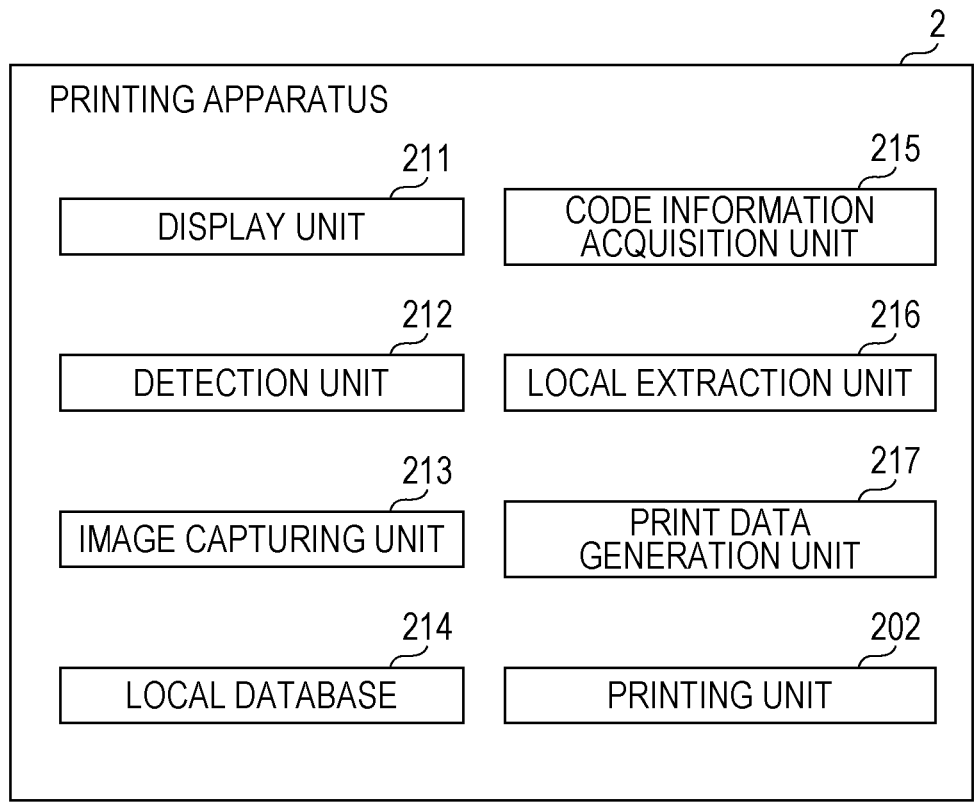
FIG. 19 illustrates code information and related information stored in a server database when a printing system is applied to a parcel delivery service.
FIG. 20 is a block diagram illustrating a functional configuration of a printing apparatus when an information processing apparatus and the printing apparatus in the printing system according to the first embodiment are implemented only by the printing apparatus.

As an application of the printing systems Sy2 to Sy5, for example, the printing systems Sy2 to Sy5 may be used to print a code related label L1 indicating a transportation path of a parcel in a parcel delivery service (see FIG. 18). In this case, as illustrated in FIG. 19, information corresponding to the code image G1 printed on a slip of a parcel is stored in the server database 301 as code information, and a name, received date, and received time of a distribution station where the parcel was received are stored as related information. Such code information and related information are acquired when code images G1 printed on slips of parcels or the like are read in each distribution station and sequentially uploaded to the server database 301. At the last distribution station, for example, when the code information is acquired from the code image G1 printed on the slip of the parcel by the code information acquisition unit 105, related information will be extracted from the server database 301, and the code related label L1 illustrated in FIG. 18 will be printed.

As illustrated in FIG. 20, the information processing apparatus 1 and the printing apparatus 2 in the printing system Sy1 described above may be implemented only by the printing apparatus 2. In this case, in addition to the printing unit 202, the printing apparatus 2 includes a display unit 211, a detection unit 212, an image capturing unit 213, a local database 214, a code information acquisition unit 215, a local extraction unit 216, and a print data generation unit 217. For example, the display unit 211 and the detection unit 212 are implemented by the operation panel provided in the printing apparatus 2, and the image capturing unit 213 is implemented by a barcode reader provided in the printing apparatus 2. The local database 214 is provided in the memory of the control circuit 23. The code information acquisition unit 215, the local extraction unit 216, and the print data generation unit 217 are implemented when the CPU of the control circuit 23 executes a predetermined program, however, a part or all of these units may be implemented only by a hardware resource. Each of these function parts functions in the same manner as each of the function parts provided in the information processing apparatus 1 of the printing system Sy1. Further, the information processing apparatus 1 and the printing apparatus 2 in the printing systems Sy2 to Sy5 may be implemented only by the printing apparatus 2.

This application claims priority under 35 U.S.C. § 119 to Japanese Patent Application No. 2016-243400, filed Dec. 15, 2016. The entire disclosure of Japanese Patent Application No. 2016-243400 is hereby incorporated herein by reference.

What is claimed is:

1. An information processing apparatus, comprising:
a processor;
a local database; and
memory storing instructions which, when executed by the processor, cause the processor to:
acquire code information indicated by a code image;
determine a type of the code image based on the acquired code information;
determine, based on the type of the code image, whether related information is extracted from the local database;
in response to determining that the related information is not extracted from the local database, transmit the code information to a server which is connected to the information processing apparatus via a network; and
in response to determining that the related information is extracted from the local database, generate print data based on related information extracted based on the acquired code information from the local database in which the code information and the related information are stored in association with each other.

2. The information processing apparatus according to claim 1,
wherein the processor is further configured to refer to the local database and extract the related information associated with the acquired code information.

3. A program for causing a computer to function as the information processing apparatus according to claim 2.

4. The information processing apparatus according to claim 1,
wherein the processor is further configured to:
transmit the code information to the server in which a server database is provided; and
receive the related information extracted from the server database and then transmitted based on the code information received by the server.

5. A program for causing a computer to function as the information processing apparatus according to claim 4.

6. The information processing apparatus according to claim 1,
wherein the processor is further configured to:
transmit the code information to the server in which a server database is provided;
receive the related information extracted from the server database and then transmitted based on the code information received by the server; and
switch, in accordance with the determined type of the code image, whether the local database is referred to or the code information is transmitted to the server.

7. The information processing apparatus according to claim 1,
wherein the processor is further configured to:
transmit the acquired code information to a plurality of servers which is connected with the information processing apparatus via a network and in which a plurality of server databases and corresponding to each of different countries is provided;
receive the related information extracted from the server database and then transmitted based on the code information received by the server;
determine a target country of the code image based on the acquired code information; and
transmit the code information to the server in which the server database corresponding to the determined target country among the plurality of servers is provided.

8. The information processing apparatus according to claim 1, wherein the processor is further configured to acquire information indicated by a barcode symbol which is the code image as the code information.

9. The information processing apparatus according to claim 8,
wherein the processor is further configured to report the type of the determined code image.

10. The information processing apparatus according to claim 1,
wherein the processor is further configured to transmit the generated print data and a print instruction to a printing apparatus.

11. The information processing apparatus according to claim 10,
wherein the processor is further configured to:
detect a print instruction operation; and
transmit the print data and the print instruction to the printing apparatus if the print instruction operation is detected.

12. The information processing apparatus according to claim 1, wherein the processor is further configured to acquire the code information by reading the code information in the code image.

13. The information processing apparatus according to claim 1, wherein the processor is further configured to generate the print data based on the related information and the acquired code information.

14. The information processing apparatus according to claim 13,
wherein the processor is further configured to:
detect a selection operation to select one layout from among a plurality of layouts which defines arrangement of a related image corresponding to the related information and the code image corresponding to the code information; and
generate the print data in the selected layout based on the detection result of the selection operation.

15. A program for causing a computer to function as the information processing apparatus according to claim 1.

16. A printing apparatus, comprising:
a processor;
a local database;
a printing mechanism; and
memory storing instructions which, when executed by the processor, cause the processor to:
acquire code information indicated by a code image;
determine a type of the code image based on the acquired code information;
determine, based on the type of the code image, whether related information is extracted from the local database;
in response to determining that the related information is not extracted from the local database, transmit the code information to a server which is connected to the information processing apparatus via a network;
in response to determining that the related information is extracted from the local database, generate print data based on related information extracted based on the acquired code information from the local database in which the code information and the related information are stored in association with each other,
wherein the printing mechanism is configured to execute printing based on the generated printing data.

17. A printing system, comprising:
an information processing apparatus; and
a printing apparatus,
wherein the information processing apparatus includes:
a processor;
a local database, and
memory storing instructions which, when executed by the processor, cause the processor to:
acquire code information indicated by a code image;
determines a type of the code image based on the acquired code information;
determine, based on the type of the code image, whether related information is extracted from the local database;
in response to determining that the related information is not extracted from the local database, transmit the code information to a server which is connected to the information processing apparatus via a network;
in response to determining that the related information is extracted from the local database, generate print data based on related information extracted based on the code information acquired by the code information acquisition unit from a database in which the code information and the related information are stored in association with each other; and
transmit the generated print data and a print instruction to the printing apparatus,
wherein the printing apparatus is configured to execute printing in accordance with the print data and the print instruction transmitted by the processor.

18. The printing system according to claim 17, further comprising a server which is connected to the information processing apparatus via a network,
wherein the processor is further configured to:
transmit the acquired code information to the server; and
receive the related information extracted from the server database and then transmitted based on the code information received by the server,
wherein the server includes:
a server database;
a further processor; and
further memory storing instructions which, when executed by the further processor, cause the further processor to:
receive the code information transmitted from the processor of the information processing apparatus;
extract the related information associated with the received code information from the server database; and
transmit the extracted related information to the information processing apparatus.

* * * * *